(12) United States Patent
Talwar et al.

(10) Patent No.: US 7,042,246 B2
(45) Date of Patent: May 9, 2006

(54) LOGIC CIRCUITS FOR PERFORMING THRESHOLD FUNCTIONS

(75) Inventors: Sunil Talwar, Warwickshire (GB); Dmitriy Rumynin, Coventry (GB); Peter Meulemans, Coventry (GB)

(73) Assignee: Arithmatica Limited, (GB)

( * ) Notice: Subject to any disclaimer, the term of this patent is extended or adjusted under 35 U.S.C. 154(b) by 67 days.

(21) Appl. No.: 10/776,938

(22) Filed: Feb. 11, 2004

(65) Prior Publication Data

US 2004/0223400 A1 Nov. 11, 2004

Related U.S. Application Data

(60) Provisional application No. 60/446,433, filed on Feb. 11, 2003.

(51) Int. Cl.
*H03K 19/23* (2006.01)

(52) U.S. Cl. ..................................................... 326/35

(58) Field of Classification Search ............... 326/35, 326/38, 80, 81
See application file for complete search history.

(56) References Cited

U.S. PATENT DOCUMENTS

| | | | |
|---|---|---|---|
| 3,634,658 A | 1/1972 | Brown | 235/92 LG |
| 3,757,098 A | 9/1973 | Wright | 235/175 |
| 4,399,517 A | 8/1983 | Niehaus et al. | 364/784 |
| 4,607,176 A | 8/1986 | Burrows et al. | 307/449 |
| 5,095,457 A | 3/1992 | Jeong | 364/758 |
| 5,175,862 A | 12/1992 | Phelps et al. | 395/800 |
| 5,187,679 A | 2/1993 | Vassiliadis et al. | 364/786 |
| 5,325,320 A | 6/1994 | Chiu | 364/760 |
| 5,343,417 A | 8/1994 | Flora | 364/758 |
| 5,497,342 A | 3/1996 | Mou et al. | 364/786 |
| 5,524,082 A | 6/1996 | Horstmann et al. | 364/489 |
| 5,701,504 A | 12/1997 | Timko | |
| 5,964,827 A | 10/1999 | Ngo et al. | 708/710 |
| 5,995,029 A | 11/1999 | Ryu | 341/101 |

(Continued)

FOREIGN PATENT DOCUMENTS

EP 0168650 1/1986

(Continued)

OTHER PUBLICATIONS

Booth, Andrew, "A Signed Binary Multiplication Technique", *Oxford University Press*, Reprinted from Q.J. Mech. Appl. Math. 4:236-240,(1951),pp. 100-104.

(Continued)

*Primary Examiner*—Robert Pascal
*Assistant Examiner*—Krista Flanagan
(74) *Attorney, Agent, or Firm*—Schwegman, Lundberg, Woessner & Kluth, P.A.

(57) ABSTRACT

Logic circuit generating four binary outputs as four threshold functions of four binary inputs, including: first, second, third, and fourth threshold functions which are respectively high if at least one, two, three and all of the binary inputs are high; first logic having two logic parts that each include NOR and NAND gates, and having two first-level inputs for receiving the binary inputs and two first-level outputs; and second logic having four second-level outputs, four second-level inputs for receiving second-level binary inputs and connected to the four first-level outputs, NAND gate, first gate generating logical OR combinations and NAND combining the logical OR combination with two other second-level binary inputs, a second gate generating logical OR combinations of two pairs of second-level binary inputs and NAND combining the logical OR combinations, and a NOR gate; wherein one of four binary outputs is generated at each of the four outputs.

52 Claims, 9 Drawing Sheets

U.S. PATENT DOCUMENTS

| | | | |
|---|---|---|---|
| 6,008,668 A * | 12/1999 | Saruwatari | 326/81 |
| 6,023,566 A | 2/2000 | Belkhale et al. | 395/500.03 |
| 6,175,852 B1 | 1/2001 | Dhong et al. | 708/712 |
| 6,269,386 B1 | 7/2001 | Siers et al. | 708/710 |
| 6,344,760 B1 * | 2/2002 | Pyo | 327/51 |
| 6,445,210 B1 * | 9/2002 | Nojiri | 326/68 |
| 6,490,608 B1 | 12/2002 | Zhu | 708/626 |
| 6,577,164 B1 * | 6/2003 | Tomita | 326/86 |
| 6,724,223 B1 * | 4/2004 | Ichiguchi et al. | 326/81 |
| 6,882,175 B1 * | 4/2005 | Motegi et al. | 326/31 |
| 2002/0026465 A1 | 2/2002 | Rumynin et al. | 708/210 |
| 2002/0078110 A1 | 6/2002 | Rumynin et al. | 708/210 |
| 2003/0016055 A1 * | 1/2003 | Oodaira et al. | 326/81 |
| 2004/0103135 A1 | 5/2004 | Talwar et al. | |
| 2004/0153490 A1 | 8/2004 | Talwar et al. | |

FOREIGN PATENT DOCUMENTS

| | | |
|---|---|---|
| EP | 0309292 | 3/1989 |
| EP | 0442356 | 8/1991 |
| EP | 0741354 | 11/1996 |
| FR | 2475250 | 8/1981 |
| GB | 2016181 | 9/1979 |
| GB | 2062310 | 5/1981 |
| GB | 2263002 | 7/1993 |
| GB | 2365636 | 2/2002 |
| GB | 2365637 | 2/2002 |
| WO | WO-99/22292 | 5/1999 |
| WO | WO-02/12995 | 2/2002 |

OTHER PUBLICATIONS

Chakraborty, S., et al., "Synthesis of Symmetric Functions for Path-Delay Fault Testability", *12th International Conference on VLSI Design*, (1999),pp. 512-517.

Dadda, L., "On Parallel Digital Multipliers", *Associazione Elettrontecnia ed Elettronica Italiana*, Reprinted from Alta Freq. 45:574-580,(1976),pp. 126-132.

Dadda, L., "Some Schemes For Parallel Multipliers", *Associazione Elettrotenica ed Elettronica Italiana*, Reprinted from Alta Freq. 34:349-356,(1965).pp. 118-125.

Debnath, D., "Minimization of AND-OR-EXOR Three-Level Networks with and Gate Sharing", *IEICE Trans. Inf. & Syst.*, E80-D, 10, (1997),pp. 1001-1008.

Drechsler, R., et al., "Sympathy: Fast Exact Minimization of Fixed Polarity Reed-Muller Expressions for Symmetric Functions", *IEEE ED&TC 1995, Proceedings European Design and Test Conference*, (Mar. 6-9, 1995),91-97.

Drechsler, R., et al. "Sympathy: Fast Exact Minimization of Fixed Polarity Reed-Muller Expressions for Symmetric Functions", *IEEE Transactions on Computer-Aided Design of Integrated Circuits and Systems*, 16(1), (1997),pp. 1-5.

Fleisher, H., "Combinatorial Techniques for Performing Arithmetic and Logical Operations", *IBM Research Center, RC-289, Research Report*, (Jul. 18, 1960),1-20.

Foster, Caxton, et al., "Counting Responders in an Associative Memory", *The Institute of Electrical and Electronics Engineers, Inc.*, Reprinted, with permission, from IEEE Trans. Comput. C-20:1580-1583,(1971),pp. 86-89.

Goto, et al., "A 54x54-b Regularly Structured Tree Multiplier", *IEEE Journal of Solid-State Circuits*, vol. 27, No. 9, (Sep. 1992),1229-1236.

Hekstra, et al., "A Fast Parallel Multiplier Architecture", *IEEE International Symposium on Circuits and Systems: Institute of Electrical and Electronic Engineers, c1977-c1996, 20v. ;ill. ;28cm*, (1992),2128-2131.

Ho, Irving, et al., "Multiple Addition by Residue Threshold Functions and Their Representation by Array Logic", *The Institute of Electrical and Electronics Engineers, Inc., Trans. Comput.* C-22:762-767, (1973),80-85.

Jones, Robert, et al., "Parallel Counter Implementation", *Conf. Rec. 26th Asilomar Conf. Signals, Systems & Computers*, vol. 1, ISBN 0-8186-3160-0,(1992),pp. 381-385.

Nienhaus, H., "Efficient Multiplexer Realizations of Symmetric Functions", *IEEE*, (1981),pp. 522-525.

Oklobdzija, V G., et al., "Improving multiplier design by using improved column compression tree and optimized final adder in CMOS technology", *IEEE transactions on Very Large Scale Integration (VLSI) Systems*, IEEE, Inc, New York, vol. 3, No. 2,(1995),292-301.

Swartzlander Jr., E E., "Parallel Counters", *IEEE Transactions on Computers*, C-22(11), (Nov. 1973),1021-1024.

Vassiliadis, S., et al., "7/2 Counters and Multiplication with Threshold Logic", *IEEE*, (1997),pp. 192-196.

Wallace, C., "A Suggestion for a Fast Multiplier", *The Institute of Electrical and Electronics Engineers, Inc., Reprinted, with permission, from IEEE Trans. Electron. Comput.* EC-13:14-17, (1964),114-117.

Zuras, D , et al., "Balanced delay trees and combinatorial division in VLSI", *IEEE Journal of Solid State Circuits*, SC-21, IEEE Inc, New York, vol. SC-21, No. 5,(1986),814-819.

"PCT international Search Report relating to PCT/GB 03/05489", (Sep. 15, 2004),4 Pages.

"United Kingdom Search Report relating to Great Britain Patent Application No. GB0326611.1", (Mar. 29, 2004),1 Page.

Bedrij, O. J., "Carry-Select Adder", *IRE Trans., EC-11*, (Jun. 1962),340-346.

Knowles, S., "A Family of Adders", *Proc. 14th IEEE Symp. on Computer Arithmetic*, (1999),30-34.

Kogge, P. M., et al., "A Parallel Algorithm for the Efficient Solution of a General Class of Recurrence Equations", *IEEE Trans. Computers*, vol. C-22, No. 8, (Aug. 1973),786-793.

Ladner, Richard E., et al., "Parallel Prefix Computation", *Journal of ACM*, vol. 27, No. 4, (Oct. 1980),831-838.

Ling, Huey, "High-Speed Binary Adder", *IBM Journal of Research and Development*, vol. 25, No. 3, (1981),156-166.

Nicholson, J. O., "Parallel-Carry Adders Listing Two-Bit Covers", *IBM Technical Disclosure Bulletin*, 22(11), (Apr. 1980),5036-5037.

Ong, S., et al., "A Comparision of ALU Structures for VLSI Technology", *Proceedings, 6th Symposium on Computer Arithmetic (IEEE)*, (1983),10-16.

Schmookler, M. S., et al., "Group-Carry Generator", *IBM Technical Disclosure Bulletin*, 6(1), (Jun., 1963),77-78.

Sklansky, J., "Conditional-Sum Addition Logic", *IRE Trans., EC-9*, (Jun. 1960),226-231.

Weinberger, A., et al., "A Logic for High-Speed Addition", *Nat. Bur. Stand. Circ.*, 591, (1958),3-12.

Weinberger, A., "Extension of the Size of Group Carry Signals", *IBM Technical Disclosure Bulletin*, 22(4), (Sep., 1979),1548-1550.

Weinberger, A., "Improved Carry-Look-Ahead", *IBM Technical Disclosure Bulletin*, 21(6), (Nov., 1978),2460-2461.

* cited by examiner

LOGIC CIRCUITS FOR PERFORMING THRESHOLD FUNCTIONS

REFERENCE TO RELATED APPLICATION

The present application claims priority under 35 U.S.C. 119 to U.S. Provisional Patent Application No. 60/446,433, filed Feb. 11, 2003 which is hereby incorporated by reference.

FIELD OF THE INVENTION

The present invention relates to logic circuits for performing threshold functions using inverting gates.

BACKGROUND OF THE INVENTION

It is known in digital electronics that threshold functions find many applications including parallel counters. It is also known that in static cmos circuits inverting gates are both fast and have small silicon area.

In the following + denotes logical OR, proximity denotes Logical AND, $^c$ denotes complement. A logical function with n inputs and one output, which is high if at least k of the n inputs are high, will be denoted by [n,k]. These functions are also known as threshold functions. It is also known that if the inputs to [n,k] are inverted, denoted [n,k], and the output is also inverted the resulting function is the threshold function [n,n−k+1]. In the notation this can be stated as $$[n,k]^c = [n,n-k+1].$$

List of Gates Referred to Herein After

| Gate | Logic equation |
| --- | --- |
| NAND | $(AB)^c$ |
| NOR | $(A + B)^c$ |
| OAI211 | $((A + B)CD)^c$ |
| OAI22 | $((A + B)(C + D))^c$ |
| AOI22 | $(AB + CD)^c$ |
| AOI21 | $(AB + C)^c$ |
| AOI211 | $(AB + C + D)^c$ |
| OAI21 | $((A + B)C)^c$ |

It is known that for parallel counters the threshold functions [4,1], [4,2], [4,3], and [4,4] need to be implemented. A prior art method is shown in FIG. 1. The drawback of this implementation is that none of the gates is an inverting gate. Each gate in the implementation being an AND gate or an OR gate.

SUMMARY OF THE INVENTION

A first aspect of the present invention provides a logic circuit for generating four binary outputs as four threshold functions of four binary inputs to the logic circuit, the threshold functions comprising a first threshold function which is high if at least one of the binary inputs is high, a second threshold function which is high if at least two of the binary inputs are high, a third threshold function which is high if at least three of the binary inputs are high, and a fourth threshold function which is high if all of the binary inputs are high, the logic circuit comprising first level logic comprising two logic parts, each logic part comprising a NOR gate and a NAND gate and having two first level inputs for receiving the binary inputs and two first level outputs; and second level logic comprising four second level outputs, four second level inputs for receiving second level binary inputs and connected to the four first level outputs, a NAND gate, a first gate generating a logical OR combination of two second level binary inputs and NAND combining the logical OR combination with two other second level binary inputs, a second gate generating logical OR combinations of two pairs of second level binary inputs and NAND combining the logical OR combinations, and a NOR gate; wherein one of said four binary outputs is generated at each of said four outputs.

In one embodiment the first gate comprises an OAI211 gate. In another embodiment the second gate comprises an OAI22 gate. The logic circuit can be incorporated in a parallel counter.

Another aspect of the present invention provides a logic circuit for generating four binary outputs as four threshold functions of four binary inputs to the logic circuit, the threshold functions comprising a first threshold function which is high if at least one of the binary inputs is high, a second threshold function which is high if at least two of the binary inputs are high, a third threshold function which is high if at least three of the binary inputs are high, and a fourth threshold function which is high if all of the binary inputs are high, the logic circuit comprising first level logic comprising two logic parts, each logic part comprising a NOR gate and a NAND gate and having two first level inputs for receiving the binary inputs and two first level outputs; and second level logic comprising four second level outputs, four second level inputs for receiving second level binary inputs and connected to the four first level outputs, a NAND gate, a first gate generating logical AND combinations of two pairs of second level binary inputs and NOR combining the logical AND combinations, a second gate generating logical OR combinations of two pairs of second level binary inputs and NAND combining the logical OR combinations, and a NOR gate; wherein one of said four binary outputs is generated at each of said four outputs.

In one embodiment the first gate comprises an AOI22 gate. In another embodiment the second gate comprises an OAI22 gate. The logic circuit can be incorporated in a parallel counter.

Another aspect of the present invention provides a logic circuit for generating three binary outputs as three threshold functions of binary inputs to the logic circuit, the threshold functions comprising a first threshold function which is high if at least one of the binary inputs is high, a second threshold function which is high if at least two of the binary inputs are high, and a third threshold function which is high if all of the binary inputs are high, the logic circuit comprising first level logic comprising two logic parts, a first logic part comprising a NOR gate and a NAND gate and having two first level inputs for receiving two of the binary inputs and two first level outputs, and a second logic part comprising an inverter having one first level logic input for receiving one of the binary inputs and one first level output; and second level logic comprising three second level outputs, and three second level inputs for receiving second level binary inputs and connected to the three first level outputs, a NAND gate, a gate generating a logical AND combination of two second level binary inputs and NOR combining the logical AND combination with one other second level binary input, and a NOR gate; wherein one of said three binary outputs is generated at each of said three outputs.

In one embodiment the first gate comprises an AOI21 gate. The logic circuit can be incorporated in a parallel counter.

Another aspect of the present invention provides a logic circuit for generating three binary outputs as three threshold functions of binary inputs to the logic circuit, the threshold functions comprising a first threshold function which is high if at least one of the binary inputs is high, a second threshold function which is high if at least two of the binary inputs are high, and a third threshold function which is high if all of the binary inputs are high, the logic circuit comprising first level logic comprising two logic parts, a first logic part comprising a NOR gate and a NAND gate and having two first level inputs for receiving two of the binary inputs and two first level outputs, and a second logic part comprising an inverter having one first level logic input for receiving one of the binary inputs and one first level output; and second level logic comprising three second level outputs, and three second level inputs for receiving second level binary inputs and connected to the three first level outputs, a NAND gate, a gate generating a logical OR combination of two second level binary inputs and NAND combining the logical OR combination with one other second level binary input, and a NOR gate; wherein one of said three binary outputs is generated at each of said three outputs.

In one embodiment the first gate comprises an OAI21 gate. The logic circuit can be incorporated in a parallel counter.

Another aspect of the present invention provides a logic circuit having seven binary inputs, the logic circuit comprising first logic for generating a first binary value as a threshold function which is high if at least four binary inputs are high, a second binary value as a threshold function which is high if less than two binary inputs are high, and a third binary value as a threshold function which is high if less than six binary inputs are high; and second logic for forming the OR combination of the first binary value and the second binary value and for NAND combining the third binary value and the result of the OR combination.

In one embodiment the second logic comprises an inverting gate such as an OAI21 gate.

Another aspect of the present invention provides a logic circuit having seven binary inputs, the logic circuit comprising first logic for generating a first binary value as a threshold function which is high if at least four binary inputs are high, a second binary value as a threshold function which is high if less than two binary inputs are high, and a third binary value as a threshold function which is high if less than six binary inputs are high; and an inverting multiplexer to select and output the inverse of the second or third binary value dependant upon the first binary value.

In one embodiment of these two aspects of the invention, the first binary logic comprises four first logic parts having four of the binary inputs for generating a fourth binary value as a threshold function which is high if at least one of the four binary inputs is high, a fifth binary value as a threshold function which is high if at least two of the four binary inputs are high, a sixth binary value as a threshold function which is high if at least three of the four binary inputs are high, and a seventh binary value as a threshold function which is high if all of the four binary inputs are high; three second logic parts having three of the binary inputs for generating an eighth binary value as a threshold function which is high if at least one of the three binary inputs is high, a ninth binary value as a threshold function which is high if at least two of the three binary inputs are high, and a tenth binary value as a threshold function which is high if all of the three binary inputs are high; first combining logic for combining the fourth binary value, the fifth binary value, the eighth binary value, and the ninth binary value to generate the second binary value; and second combining logic for combining the sixth binary value, the seventh binary value, the ninth binary value, and the tenth binary value to generate the third binary value.

In one embodiment the first combining logic comprises logic for logically AND combining the fourth binary value and the eighth binary value, and for logically NOR combining the fifth binary value, the ninth binary value, and the results of the logical combination.

In one embodiment the first combining logic comprises an inverting gate such as an AOI211 gate.

In one embodiment the first combining logic comprises logic for logically OR combining the fifth binary value and the eighth binary value, and for logically OR combining the fourth binary value, the ninth binary value, and for logically NAND combining the results of the logical combinations.

In one embodiment the first combining logic comprises an inverting gate such as an OAI22 gate.

In one embodiment the second combining logic comprises logic for logically AND combining the sixth binary value and the tenth binary value, for logically AND combining the seventh binary value and the ninth binary value, and for logically NOR combining the results of the logical combinations.

In one embodiment the first combining logic comprises an inverting gate such as an AOI22 gate.

The logic of the present invention can comprise any suitable logic for performing the functions.

DETAILED DESCRIPTION OF EMBODIMENTS OF THE INVENTION

Figure 1:
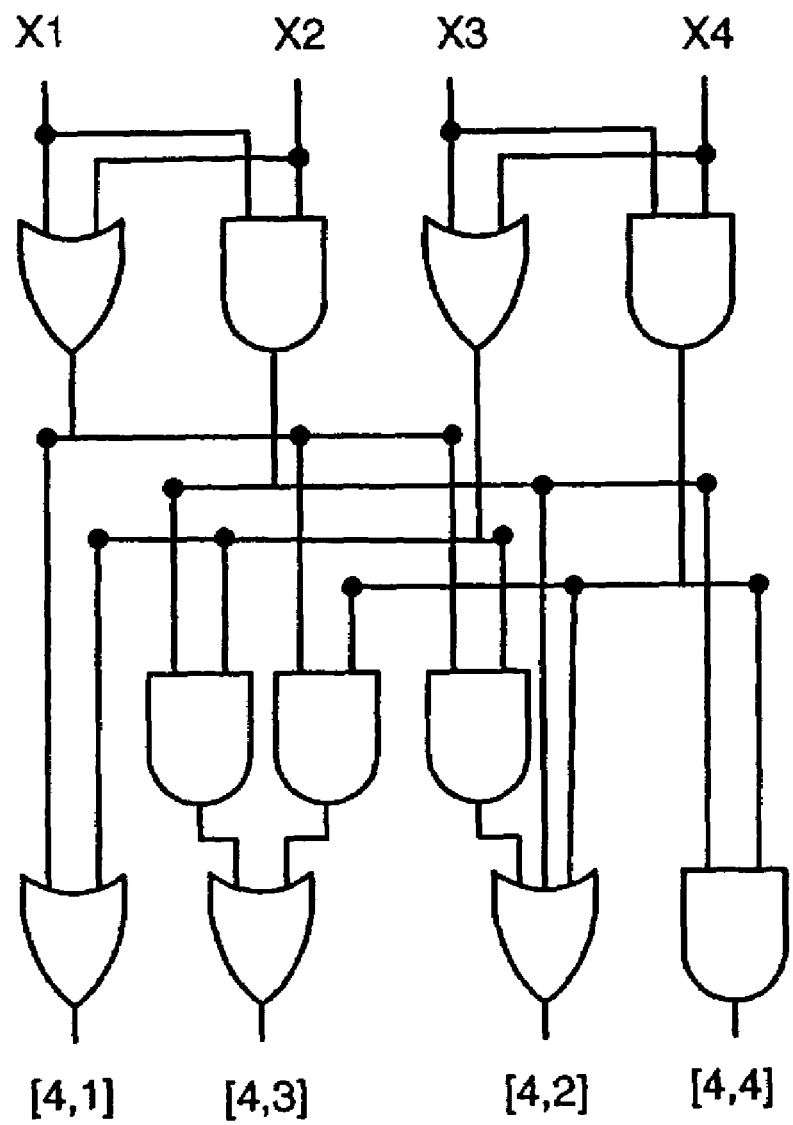
FIG. 1 is a schematic diagram of a logic circuit for performing the functions [4,1], [4,2], [4,3], and [4,4] in accordance with the prior art.
Figure 2:
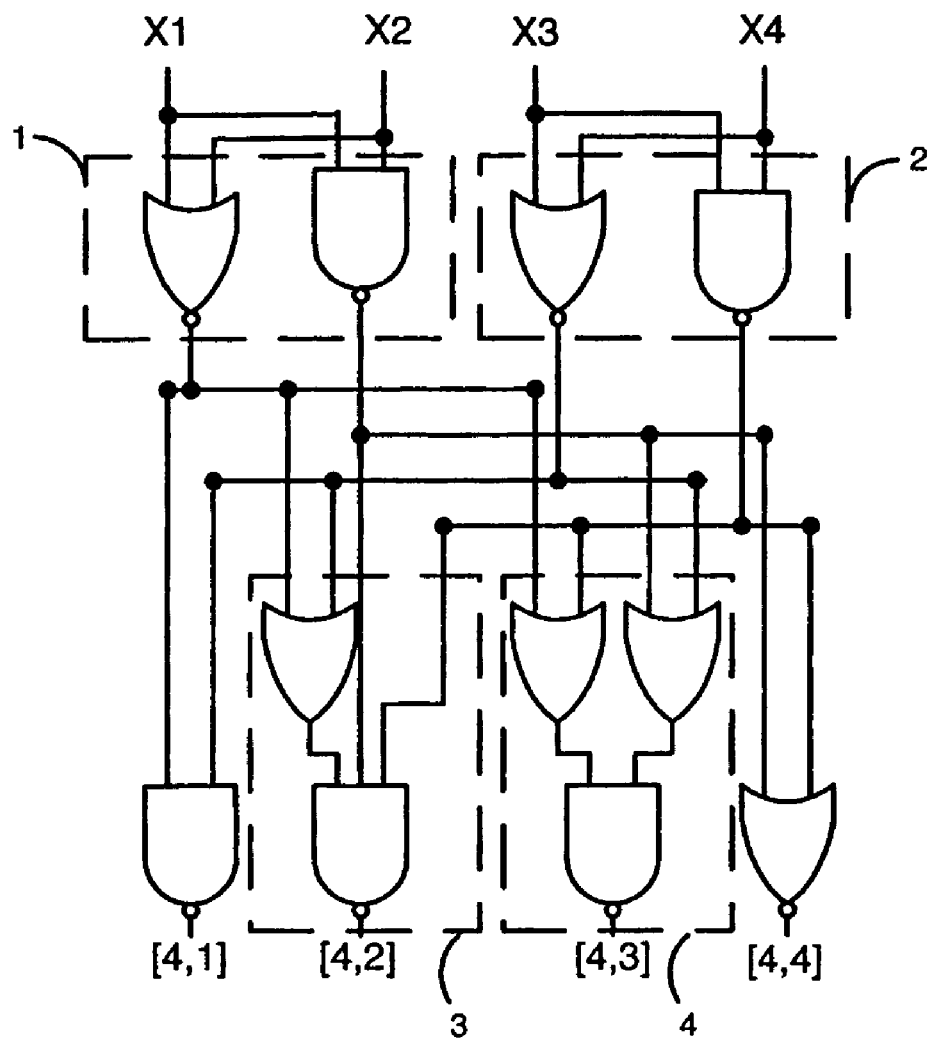
FIG. 2 is a schematic diagram of a logic circuit in accordance with a first embodiment of the present invention.

In the first embodiment of the present invention, it is noted that each of the functions [4,1], [4,2], [4,3], and [4,4] can be computed with at most two inverting gate delays. Referring to FIG. 2, the logic module has four inputs X1, X2, X3, X4 and four outputs [4,1], [4,2], [4,3], and [4,4]. The outputs [4,i] are high if at least i of the inputs are high. The logic module is partitioned into two levels. A first level is partitioned into two parts 1 and 2. Each part 1 and 2 has two inputs and two outputs. The logic in each part comprises a NOR gate and a NAND gate. A second level has as inputs the four outputs of first level and comprises a NAND gate, an OAI211 gate 3, an OAI22 gate 4, and a NOR gate.

Figure 3:
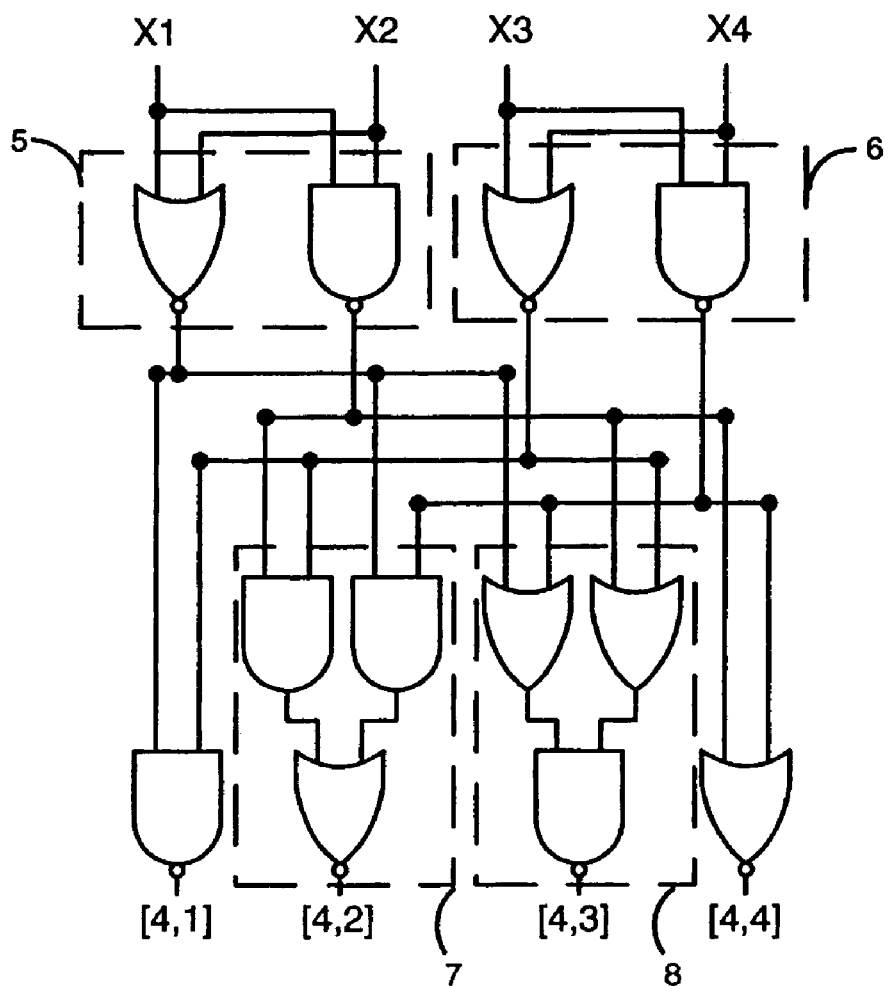
FIG. 3 is a schematic diagram of a logic circuit in accordance with a second embodiment of the present invention.

It is known in digital electronics that OAI211 gates, implementing logic function $((A+B)CD)^c$ are not very efficient. The inventors have observed that $[4,2]=[4,3]^c=([2,1]_0[2,2]_1+[2,2]_0[2,1]_1)^c=([2,2]_0{}^c[2,1]_1{}^c+[2,1]_0{}^c[2,2]_1{}^c)^2$. Thus a second embodiment of the present invention is illustrated in FIG. 3. The logic module has four inputs X1, X2, X3, X4 and four outputs [4,1], [4,2], [4,3], and [4,4]. The outputs [4,i] are high if at least i of the inputs are high. The logic module is partitioned into two levels. A first level is partitioned into two parts 5 and 6. Each part 5 and 6 has two inputs and consists of a NOR gate and a NAND gate. A second level has as inputs the four outputs of first level and consists of a NAND gate, an AOI22 gate 7, an OAI22 gate 8, and a NOR gate.

Figure 4:
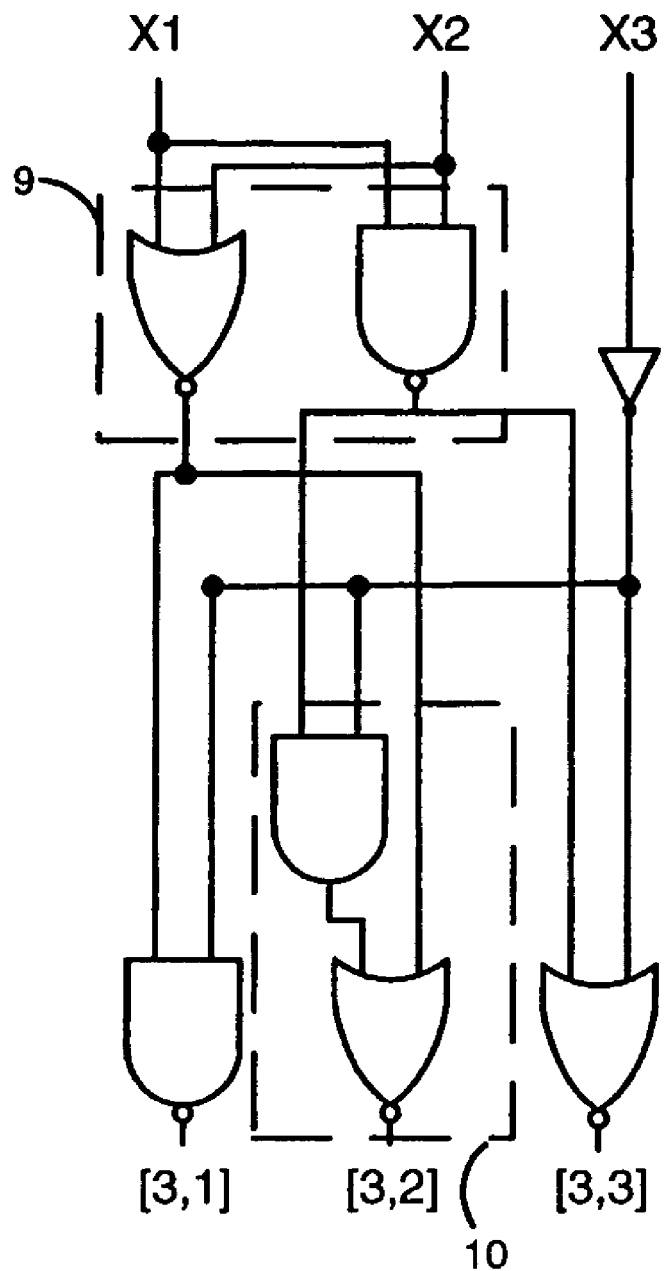
FIG. 4 is a schematic diagram of a logic circuit in accordance with a third embodiment of the present invention.

A third embodiment of the present invention will now be described with reference to FIG. 4. It is known that for parallel counters the threshold functions [3,1], [3,2], and [3,3] need to be implemented. FIG. 4 illustrates a logic module having three inputs X5, X6, X7 and three outputs [3,1], [3,2], and [3,3]. The outputs [3,i] are high if at least i of the inputs are high. The logic module is partitioned into two levels. A first level is partitioned into two parts. A first part 9 has two inputs and consists of a NOR gate and a NAND gate. A second part has one input and consisting of an inverter. A second level has as inputs the three outputs of first level and consists of NAND gate, AOI21 gate 10, and NOR gate.

Figure 5:
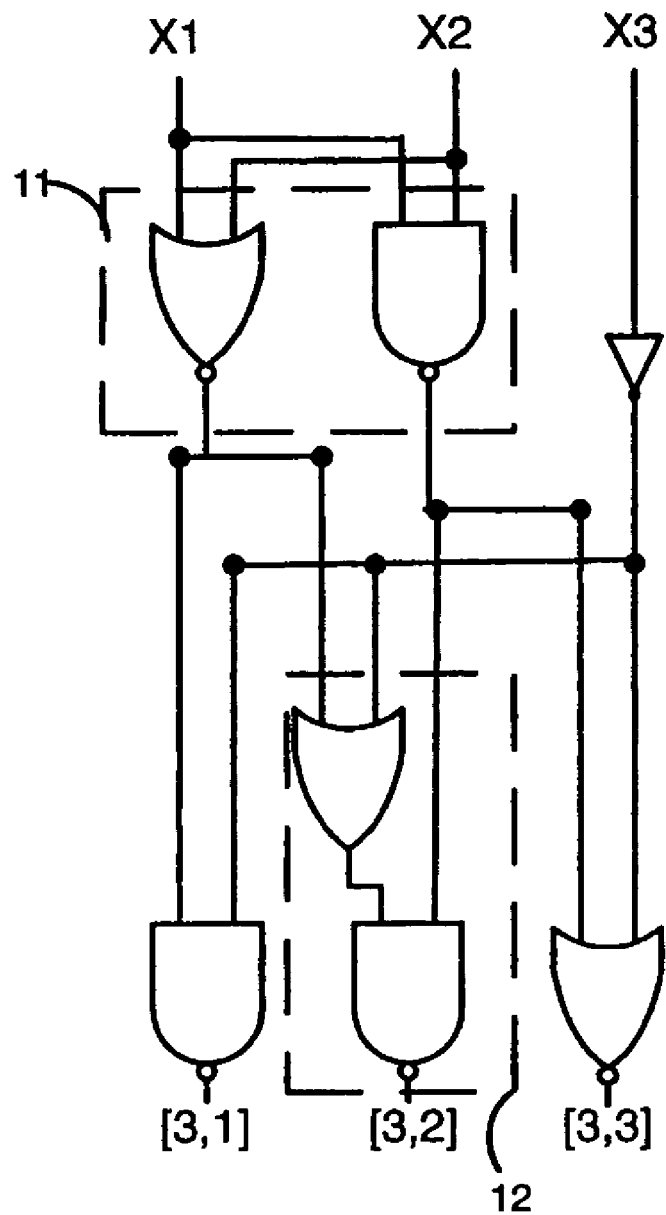
FIG. 5 is a schematic diagram of a logic circuit in accordance with a fourth embodiment of the present invention.

It is known in digital electronics that AOI21 gates, implementing logic function $(AB+C)^c$ are less efficient than OAI21 gate which implement logic function $((A+B)C)^c$. Thus FIG. 5 illustrates a fourth embodiment of the present invention. As can be seen in FIG. 5, the logic module has three inputs X5, X6, X7 and three outputs [3,1], [3,2], and [3,3]. The outputs [3,i] are high if at least i of the inputs are high. The logic module is partitioned into two levels. A first level is partitioned into two parts. A first part 11 has two inputs and consists of a NOR gate and a NAND gate. A second part has one input and consists of an inverter. A second level has as inputs the three outputs of first level and consists of NAND gate, OAI21 gate 12, and NOR gate.

Figure 6:
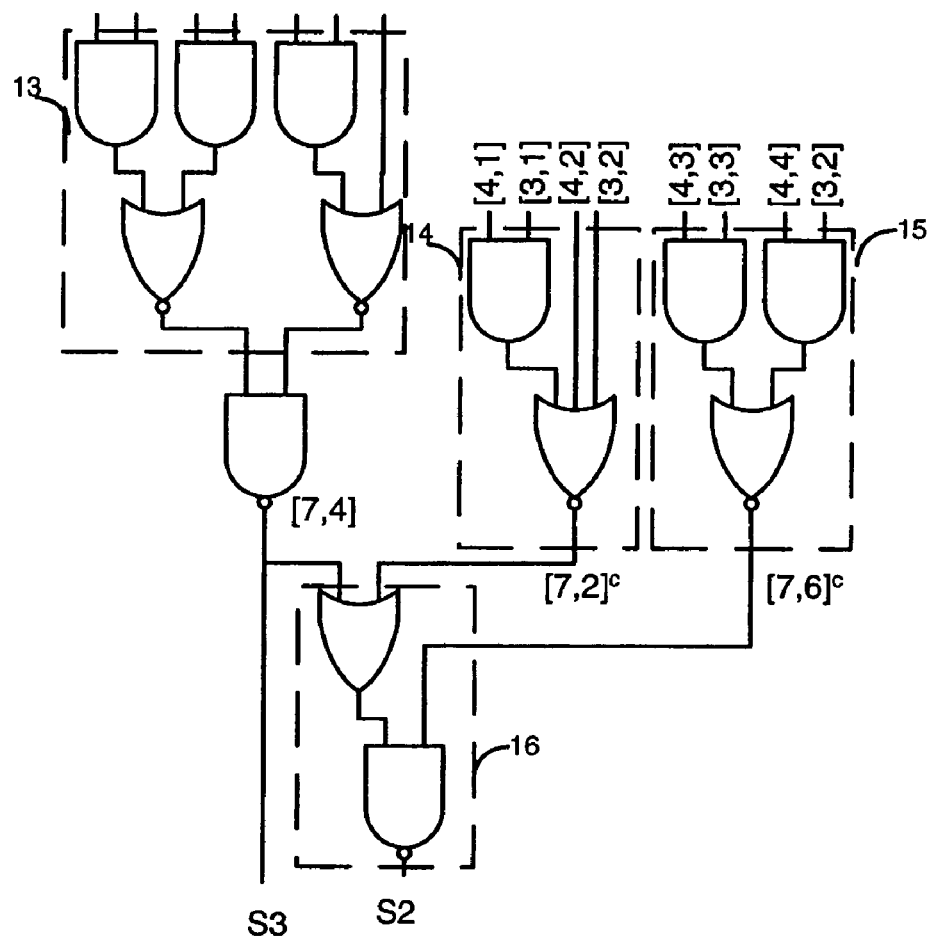
FIG. 6 is a schematic diagram of a logic circuit in accordance with a fifth embodiment of the present invention.

Threshold functions find applications in parallel counters. It is known that the most significant bit S3 of a 7 to 3 (7,3)-counter is high if at least four of the seven inputs are high, that is [7,4] is high. It is also known that the bit of one less significance, S2 has logical equation $[7,4]^c[7,2]+[7,6]$. The inventors have observed that since both [7,4] and $[7,4]^c$ are required, an extra inverter delay is introduced. In a fifth embodiment of the present invention, this drawback is overcome by combining the functions [7,4], $[7,2]^c$, and $[7,6]^c$ using a single inverting gate, $OAI21=(([7,4]+[7,2]^c)[7,6]^c)^c$ to form S2 and so an inverter is not needed to form $[7,4]^c$. Referring to FIG. 6, a (7,3) Parallel counter comprises three logic modules 13, 14 and 15 to form threshold functions [7,4], $[7,2]^c$ and $[7,6]^c$ and a single inverting gate 16 to form the combination $(([7,4]+[7,2]^c)[7,6]^c)^c$ of the three logic functions to form S2.

The inventors have observed that the two functions $[7,2]^c$ and $[7,6]^c$ can be formed from the functions [4,1], [4,2], [4,3], and [4,4] and [3,1], [3,2], and [3,3] using a single inverting gate for each function, AOI211 for $[7,2]^c$ and AOI22 for $[7,6]^c$ as shown in FIG. 6 using the relationships:

$$[7,2]^c=([4,1][3,1]+[4,2]+[3,2])^c$$

$$[7,6]^c=([4,3][3,3]+[4,4][3,2])^c$$

The inventors have further observed that AOI211 gates are not very efficient. The inventors have overcome this in a sixth embodiment of the present invention using the following relationships:

$$\begin{aligned}[7,2]^c &= (([7,2]^c)^c)^c = (\underline{[7,6]})^c \\ &= (([4,3][3,3]+[4,4][3,2])^c)^c \\ &= ((([4,3]^c+[3,3]^c)([4,4]^c+[3,2]^c))^c \\ &= (([4,2]+[3,1])([4,1]+[3,2]))^c\end{aligned}$$

Figure 7:
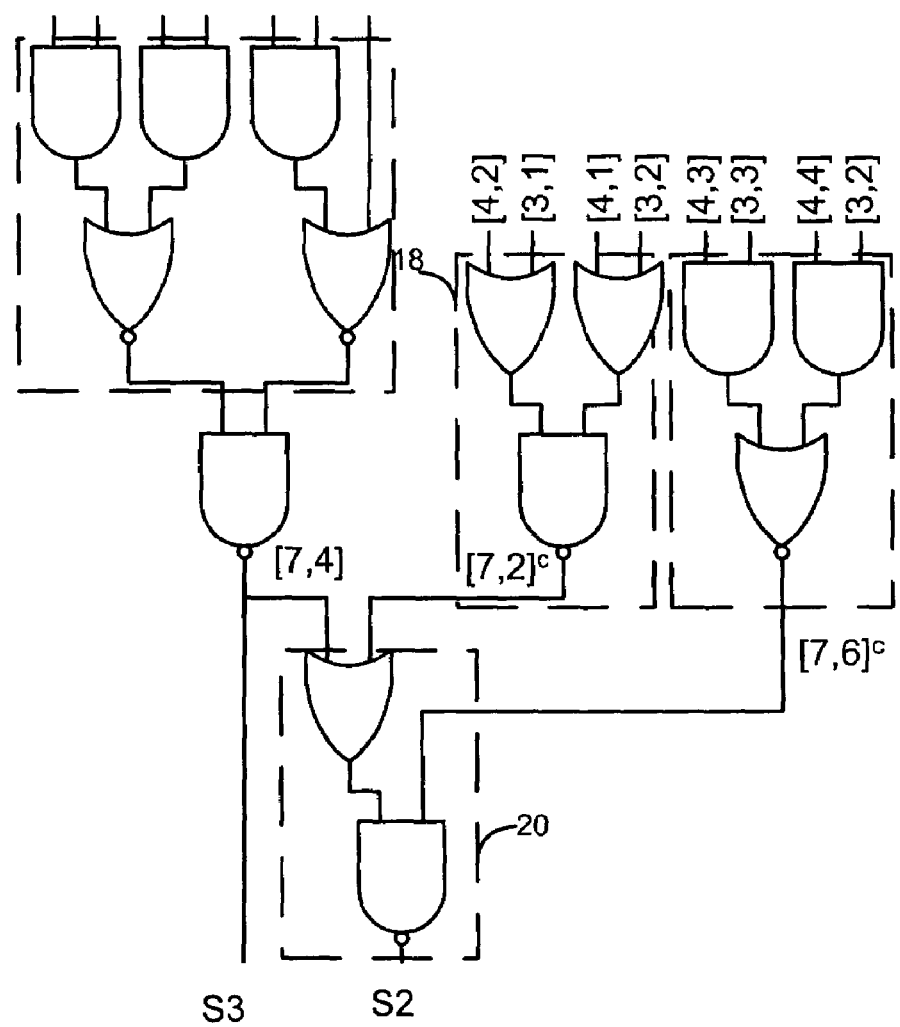
FIG. 7 is a schematic diagram of a logic circuit in accordance with a sixth embodiment of the present invention.
Figure 8:
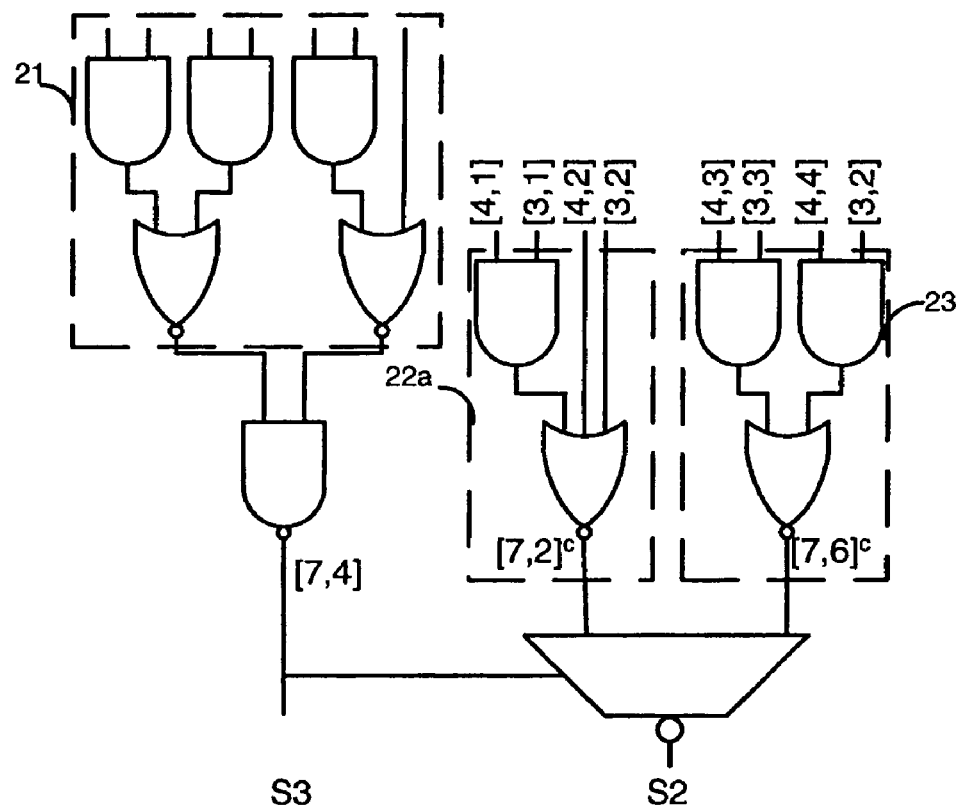
FIG. 8 is a schematic diagram of a logic circuit in accordance with a seventh embodiment of the present invention.
Figure 9:
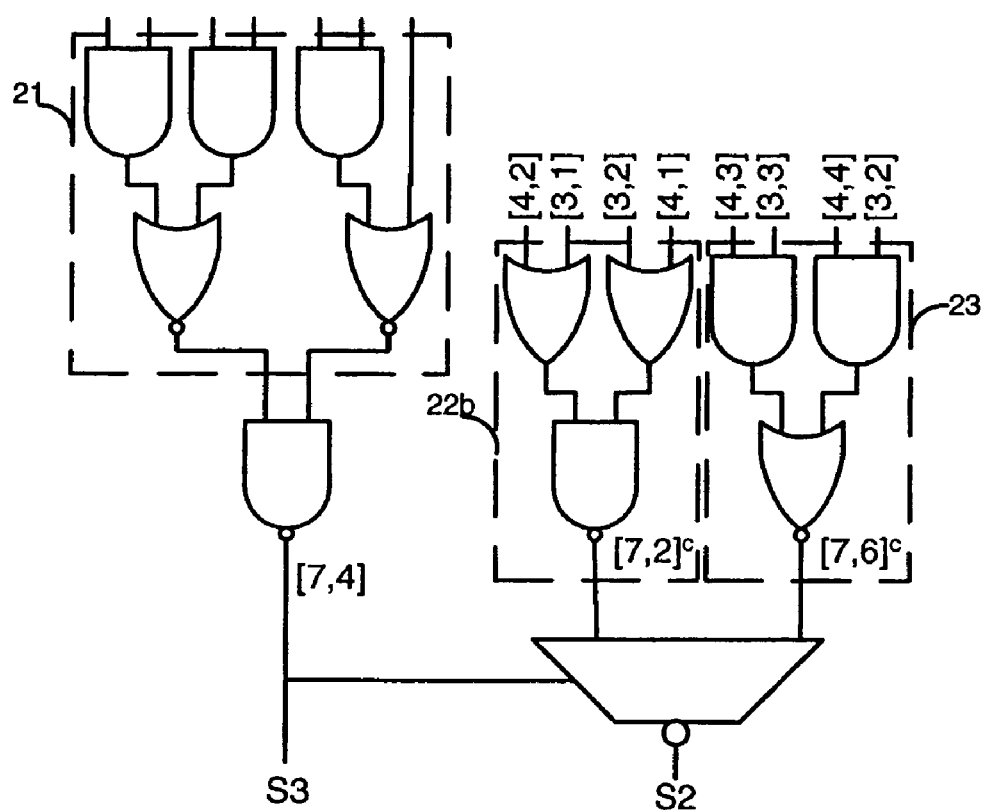
FIG. 9 is a schematic diagram of a logic circuit in accordance with an eighth embodiment of the present invention.

FIG. 7 illustrates the sixth embodiment of the present invention. The logic 18 for the generation of $[7,2]^c$ has as inputs [4,1], [4,2], [3,1] and [3,2] and one output indicating less than 2 of the inputs are high. The logic comprises a single inverting gate OAI22 20 for implementing the logic equation $(([4,2]+[3,1])([4,1]+[3,2]))^c$ The inventors have also observed that inverting multiplexers are fast devices in static cmos. FIGS. 8 and 9 illustrate seventh and eighth embodiments of the present invention. A (7,3) parallel counter comprises logic 21, 22a or 22b and 23 to form threshold functions [7,4], $[7,2]^c$ and $[7,6]^c$, and an inverting multiplexer to form the combination $([7,4]^c[7,2]^c+[7,4][7,6]^c)^c$ of the three logic functions to form S2. In the embodiment of FIG. 8 the logic 22a to form the function $[7,2]^c$ is the same as the fifth embodiment and in FIG. 9 the logic 22b to form the function $[7,2]^c$ is the same as the sixth embodiment.

An aspect of the present invention includes a logic circuit for generating four binary outputs as four threshold functions of four binary inputs to the logic circuit, the threshold functions comprising a first threshold function which is high if at least one of the binary inputs is high, a second threshold function which is high if at least two of the binary inputs are high, a third threshold function which is high if at least three of the binary inputs are high, and a fourth threshold function which is high if all of the binary inputs are high, the logic circuit comprising first level logic comprising two logic parts, each logic part comprising a NOR gate and a NAND gate and having two first level inputs for receiving the binary inputs and two first level outputs; and second level logic comprising four second level outputs, four second level inputs for receiving second level binary inputs and connected to the four first level outputs, a NAND gate, a first gate generating a logical OR combination of two second level binary inputs and NAND combining the logical OR combination with two other second level binary inputs, a second gate generating logical OR combinations of two pairs of second level binary inputs and NAND combining the logical OR combinations, and a NOR gate; wherein one of said four binary outputs is generated at each of said four outputs.

Although the present invention has been described with reference to specific embodiments, it will be apparent to a skilled person in the art that modifications lie within the spirit and scope of the present invention.

What is claimed is:

1. A logic circuit for generating four binary outputs as four threshold functions of four binary inputs to the logic circuit, the threshold functions comprising a first threshold function which is high if at least one of the binary inputs is high, a second threshold function which is high if at least two of the binary inputs are high, a third threshold function which is high if at least three of the binary inputs are high, and a fourth threshold function which is high if all of the binary inputs are high, the logic circuit comprising:

first level logic comprising two logic parts, each logic part comprising a NOR gate and a NAND gate and having two first level inputs for receiving the binary inputs and two first level outputs; and second level logic comprising four second level outputs, four second level inputs for receiving second level binary inputs and connected to the four first level outputs, a NAND gate, a first gate generating a logical OR combination of two second level binary inputs and NAND combining the logical OR combination with two other second level binary inputs, a second gate generating logical OR combinations of two pairs of second level binary inputs and NAND combining the logical OR combinations, and a NOR gate;

wherein one of said four binary outputs is generated at each of said four outputs.

2. A logic circuit according to claim 1, wherein said first gate comprises an $((A+B)CD)^c$ gate to implement the logic equation $((A+B)CD)^c$, wherein + denotes logical OR, proximity denotes logical AND, $^c$ denotes complement, and A, B, C, D denote inputs to said $((A+B)CD)^c$ gate.

3. A logic circuit according to claim 1, wherein said second gate comprises an $((A+B)(C+D))^c$ gate to implement the logic equation $((A+B)(C+D))^c$, wherein + denotes logical OR, proximity denotes logical AND, $^c$ denotes complement, and A, B, C, D denote inputs to said $((A+B)(C+D))^c$ gate.

4. A parallel counter including the logic circuit according to claim 1.

5. A logic circuit for generating four binary outputs as four threshold functions of four binary inputs to the logic circuit, the threshold functions comprising a first threshold function which is high if at least one of the binary inputs is high, a second threshold function which is high if at least two of the binary inputs are high, a third threshold function which is high if at least three of the binary inputs are high, and a fourth threshold function which is high if all of the binary inputs are high, the logic circuit comprising:

first level logic comprising two logic parts, each logic part comprising a NOR gate and a NAND gate and having two first level inputs for receiving the binary inputs and two first level outputs; and second level logic comprising four second level outputs, four second level inputs for receiving second level binary inputs and connected to the four first level outputs, a NAND gate, a first gate generating logical AND combinations of two pairs of second level binary inputs and NOR combining the logical AND combinations, a second gate generating logical OR combinations of two pairs of second level binary inputs and NAND combining the logical OR combinations, and a NOR gate;

wherein one of said four binary outputs is generated at each of said four outputs.

6. A logic circuit according to claim 5, wherein said first gate comprises an $(AB+CD)^c$ gate to implement the logic equation $(AB+CD)^c$, wherein + denotes logical OR, proximity denotes logical AND, $^c$ denotes complement, and A, B, C, D denote inputs to said $(AB+CD)^c$ gate.

7. A logic circuit according to claim 5, wherein said second gate comprises an $((A+B)(C+D))^c$ gate to implement the logic equation $((A+B)(C+D))^c$, wherein + denotes logical OR, proximity denotes logical AND, $^c$ denotes complement, and A, B, C, D denote inputs to said $((A+B)(C+D))^c$ gate.

8. A parallel counter including the logic circuit according to claim 5.

9. A logic circuit for generating three binary outputs as three threshold functions of binary inputs to the logic circuit, the threshold functions comprising a first threshold function which is high if at least one of the binary inputs is high, a second threshold function which is high if at least two of the binary inputs are high, and a third threshold function which is high if all of the binary inputs are high, the logic circuit comprising:

first level logic comprising two logic parts, a first logic part comprising a NOR gate and a NAND gate and having two first level inputs for receiving two of the binary inputs and two first level outputs, and a second logic part comprising an inverter having one first level logic input for receiving one of the binary inputs and one first level output; and second level logic comprising three second level outputs, and three second level inputs for receiving second level binary inputs and connected to the three first level outputs, a NAND gate, a gate generating a logical AND combination of two second level binary inputs and NOR combining the logical AND combination with one other second level binary input, and a NOR gate;

wherein one of said three binary outputs is generated at each of said three outputs.

10. A logic circuit according to claim 9, wherein said first gate comprises an $(AB+C)^c$ gate to implement the logic equation $(AB+C)^c$, wherein + denotes logical OR, proximity denotes logical AND, $^c$ denotes complement, and A. B, C denote inputs to said $(AB+C)^c$ gate.

11. A parallel counter including the logic circuit according to claim 9.

12. A logic circuit for generating three binary outputs as three threshold functions of binary inputs to the logic circuit, the threshold functions comprising a first threshold function which is high if at least one of the binary inputs is high, a second threshold function which is high if at least two of the binary inputs are high, and a third threshold function which is high if all of the binary inputs are high, the logic circuit comprising:

first level logic comprising two logic parts, a first logic part comprising a NOR gate and a NAND gate and having two first level inputs for receiving two of the binary inputs and two first level outputs, and a second logic part comprising an inverter having one first level logic input for receiving one of the binary inputs and one first level output; and second level logic comprising three second level outputs, and three second level inputs for receiving second level binary inputs and connected to the three first level outputs, a NAND gate, a gate generating a logical OR combination of two second level binary inputs and NAND combining the logical OR combination with one other second level binary input, and a NOR gate;

wherein one of said three binary outputs is generated at each of said three outputs.

13. A logic circuit according to claim 12, wherein said first gate comprises an $((A+B)C)^c$ gate to implement the logic equation $((A+B)C)^c$, wherein + denotes logical OR, proximity denotes logical AND, $^c$ denotes complement, and A. B. C denote inputs to said $((A+B)C)^c$ gate.

14. A parallel counter including the logic circuit according to claim 12.

15. A logic circuit having seven binary inputs, the logic circuit comprising:
first logic for generating a first binary value as a threshold function which is high if at least four binary inputs are high, a second binary value as a threshold function which is high if less than two binary inputs are high, and a third binary value as a threshold function which is high if less than six binary inputs are high; and
second logic for forming the OR combination of the first binary value and the second binary value and for NAND combining the third binary value and the result of the OR combination.

16. A logic circuit according to claim 15, wherein said second logic comprises an inverting gate.

17. A logic circuit according to claim 15, wherein said second logic comprises an $((A+B)C)^c$ gate to implement the logic equation $((A+B)C)^c$, wherein + denotes logical OR, proximity denotes logical AND, $^c$ denotes complement, and A, B, C denote inputs to said $((A+B)C)^c$ gate.

18. A logic circuit according to claim 15, wherein said first binary logic comprises four first logic parts having four of the binary inputs for generating a fourth binary value as a threshold function which is high if at least one of the four binary inputs is high, a fifth binary value as a threshold function which is high if at least two of the four binary inputs are high, a sixth binary value as a threshold function which is high if at least three of the four binary inputs are high, and a seventh binary value as a threshold function which is high if all of the four binary inputs are high; three second logic parts having three of the binary inputs for generating an eighth binary value as a threshold function which is high if at least one of the three binary inputs is high, a ninth binary value as a threshold function which is high if at least two of the three binary inputs are high, and a tenth binary value as a threshold function which is high if all of the three binary inputs are high; first combining logic for combining said fourth binary value,
said fifth binary value, said eighth binary value, and said ninth binary value to generate said second binary value; and second combining logic for combining said sixth binary value, said
seventh binary value, said ninth binary value, and said tenth binary value to generate said third binary value.

19. A logic circuit according to claim 18, wherein said first combining logic comprises logic for logically AND combining said fourth binary value and said eighth binary value, and for logically NOR combining said fifth binary value, said ninth binary value, and the results of the logical combination.

20. A logic circuit according to claim 19, wherein said first combining logic comprises an inverting gate.

21. A logic circuit according to claim 19, wherein said first combining logic comprises an $(AB+C+D)^c$ gate to implement the logic equation $(AB+C+D)^c$, wherein + denotes logical OR, proximity denotes logical AND, $^c$ denotes complement, and A, B, C, D denote inputs to said $(AB+C+D)^c$ gate.

22. A logic circuit according to claim 18, wherein said first combining logic comprises logic for logically OR combining said fifth binary value and said eighth binary value, and for logically OR combining said fourth binary value, said ninth binary value, and for logically NAND combining the results of the logical combinations.

23. A logic circuit according to claim 22, wherein said first combining logic comprises an inverting gate.

24. A logic circuit according to claim 22, wherein said first combining logic comprises an $((A+B)(C+D))^c$ gate to implement the logic equation $((A+B)(C+D)^c$, wherein + denotes logical OR, proximity denotes logical AND, $^c$ denotes complement, and A, B, C, D denote inputs to said $((A+B)(C+D))^c$ gate.

25. A logic circuit according to claim 18, wherein said second combining logic comprises logic for logically AND combining said sixth binary value and said tenth binary value, for logically AND combining said seventh binary value and said ninth binary value, and for logically NOR combining the results of the logical combinations.

26. A logic circuit according to claim 25, wherein said second combining logic comprises an inverting gate.

27. A logic circuit according to claim 25, wherein said second combining logic comprises an $(AB+CD)^c$ gate to implement the logic equation $(AB+CD)^c$, wherein + denotes logical OR, proximity denotes logical AND, $^c$ denotes complement, and A, B, C, D denote inputs to said $(AB+CD)^c$ gate.

28. A logic circuit according to claim 19, wherein said second combining logic comprises logic for logically AND combining said sixth binary value and said tenth binary value, for logically AND combining said seventh binary value and said ninth binary value, and for logically NOR combining the results of the logical combinations.

29. A logic circuit according to claim 28, wherein said second combining logic comprises an inverting gate.

30. A logic circuit according to claim 28, wherein said second combining logic comprises an $(AB+CD)^c$ gate to implement the logic equation $(AB+CD)^c$, wherein + denotes logical OR, proximity denotes logical AND, $^c$ denotes complements and A, B, C, D denote inputs to said $(AB+CD)^c$ gate.

31. A logic circuit according to claim 22, wherein said second combining logic comprises logic for logically AND combining said sixth binary value and said tenth binary value, for logically AND combining said seventh binary value and said ninth binary value, and for logically NOR combining the results of the logical combinations.

32. A logic circuit according to claim 31, wherein said second combining logic comprises an inverting gate.

33. A logic circuit according to claim 31, wherein said second combining logic comprises an $(AB+CD)^c$ gate to implement the logic equation $(AB+CD)^c$, wherein + denotes logical OR, proximity denotes logical AND, $^c$ denotes complement, and A, B, C, D denote inputs to said $(AB+CD)^c$ gate.

34. A logic circuit having seven binary inputs, the logic circuit comprising:
first logic for generating a first binary value as a threshold function which is high if at least four binary inputs are high, a second binary value as a threshold function which is high if less than two binary inputs are high, and a third binary value as a threshold function which is high if less than six binary inputs are high; and
an inverting multiplexer to select and output the inverse of the second or third binary value dependant upon the first binary value.

35. A logic circuit according to claim 34, wherein said first binary logic comprises four first logic parts having four of the binary inputs for generating a fourth binary value as a threshold function which is high if at least one of the four binary inputs is high, a fifth binary value as a threshold function which is high if at least two of the four binary inputs are high, a sixth binary value as a threshold function which is high if at least three of the four binary inputs are high, and a seventh binary value as a threshold function which is high if all of the four binary inputs are high; three second logic parts having three of the binary inputs for generating an eighth binary value as a threshold function which is high if at least one of the three binary inputs is high, a ninth binary value as a threshold function which is high if at least two of the three binary inputs are high, and a tenth binary value as a threshold function which is high if all of the three binary inputs are high; first combining logic for combining said fourth binary value, said fifth binary value, said eighth binary value, and said ninth binary value to generate said second binary value; and second combining logic for combining said sixth binary value, said seventh binary value, said ninth binary value, and said tenth binary value to generate said third binary value.

36. A logic circuit according to claim 35, wherein said first combining logic comprises logic for logically AND combining said fourth binary value and said eighth binary value, and for logically NOR combining said fifth binary value, said ninth binary value, and the results of the logical combination.

37. A logic circuit according to claim 35, wherein said first combining logic comprises an inverting gate.

38. A logic circuit according to claim 35, wherein said first combining logic comprises an $(AB+C+D)^c$ gate to implement the logic equation $(AB+C+D)^c$, wherein + denotes logical OR, proximity denotes logical AND, $^c$ denotes complement, and A, B, C, D denote inputs to said $(AB+C+D)^c$ gate.

39. A logic circuit according to claim 35, wherein said first combining logic comprises logic for logically OR combining said fifth binary value and said eighth binary value, and for logically OR combining said fourth binary value, said ninth binary value, and for logically NAND combining the results of the logical combinations.

40. A logic circuit according to claim 35, wherein said first combining logic comprises an inverting gate.

41. A logic circuit according to claim 35, wherein said first combining logic comprises an $((A+B)(C+D))^c$ gate to implement the logic equation $((A+B)(C+D))^c$, wherein + denotes logical OR, proximity denotes logical AND, $^c$ denotes complement, and A, B, C, D denote inputs to said $((A+B)(C+D))^c$ gate.

42. A logic circuit according to claim 35, wherein said second combining logic comprises logic for logically AND combining said sixth binary value and said tenth binary value, for logically AND combining said seventh binary value and said ninth binary value, and for logically NOR combining the results of the logical combinations.

43. A logic circuit according to claim 42, wherein said second combining logic comprises an inverting gate.

44. A logic circuit according to claim 42, wherein said second combining logic comprises an $(AB+CD)^c$ gate to implement the logic equation $(AB+CD)^c$, wherein + denotes logical OR, proximity denotes logical AND, $^c$ denotes complement, and A, B, C, D denote inputs to said $(AB+CD)^c$ gate.

45. A logic circuit according to claim 36, wherein said second combining logic comprises logic for logically AND combining said sixth binary value and said tenth binary value, for logically AND combining said seventh binary value and said ninth binary value, and for logically NOR combining the results of the logical combinations.

46. A logic circuit according to claim 45, wherein said second combining logic comprises an inverting gate.

47. A logic circuit according to claim 45, wherein said second combining logic comprises an $(AB+CD)^c$ gate to implement the logic equation $(AB+CD)^c$, wherein + denotes logical OR, proximity denotes logical AND, $^c$ denotes complement, and A, B, C, D denote inputs to said $(AB+CD)^c$ gate.

48. A logic circuit according to claim 39, wherein said second combining logic comprises logic for logically AND combining said sixth binary value and said tenth binary value, for logically AND combining said seventh binary value and said ninth binary value, and for logically NOR combining the results of the logical combinations.

49. A logic circuit according to claim 48, wherein said second combining logic comprises an inverting gate.

50. A logic circuit according to claim 48, wherein said second combining logic comprises an $(AB+CD)^c$ gate to implement the logic equation $(AB+CD)^c$, wherein + denotes logical OR, proximity denotes logical AND, $^c$ denotes complement, and A, B, C, D denote inputs to said $(AB+CD)^c$ gate.

51. A parallel counter including the logic circuit according to claim 15.

52. A parallel counter including the logic circuit according to claim 34.

* * * * *

UNITED STATES PATENT AND TRADEMARK OFFICE
CERTIFICATE OF CORRECTION

| | | |
|---|---|---|
| PATENT NO. | : 7,042,246 B2 | Page 1 of 1 |
| APPLICATION NO. | : 10/776938 | |
| DATED | : May 9, 2006 | |
| INVENTOR(S) | : Talwar et al. | |

It is certified that error appears in the above-identified patent and that said Letters Patent is hereby corrected as shown below:

On the face page, in field (56), under "Foreign Patent Documents", in column 2, line 1, after "1/1986" insert -- G06F/15/60 --.

In column 8, line 34, in Claim 10, delete "A." and insert -- A, --, therefor.

In column 8, line 66, in Claim 13, delete "A.B." and insert -- A, B, --, therefor.

In column 10, line 3, in Claim 24, delete "$((A+B)(C+D^C,$" and insert -- $((A+B)(C+D))^C$, --, therefor.

Signed and Sealed this

Second Day of January, 2007

JON W. DUDAS
*Director of the United States Patent and Trademark Office*